C. S. HELLER.
APPARATUS FOR USE IN RECLAIMING VULCANIZED RUBBER WASTE.
APPLICATION FILED OCT. 2, 1914.
Reissued Dec. 7, 1915. 14,027.
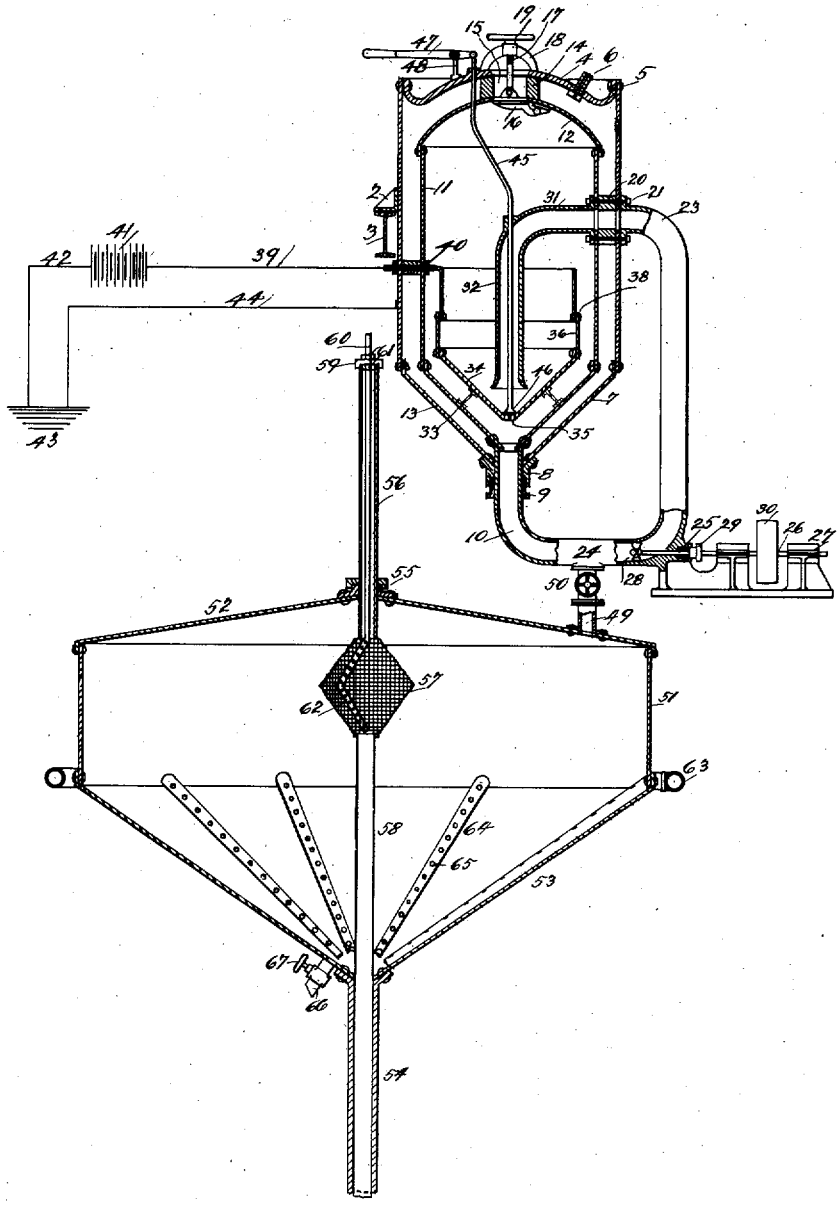
WITNESSES:
M. Schwan.
J. F. Geer
INVENTOR
Charles S. Heller.
BY Fisher & Moser
ATTORNEY

UNITED STATES PATENT OFFICE.

CHARLES S. HELLER, OF BARBERTON, OHIO, ASSIGNOR TO THE MOORE ARCHITECTURAL AND ENGINEERING COMPANY, OF AKRON, OHIO, A CORPORATION OF OHIO.

APPARATUS FOR USE IN RECLAIMING VULCANIZED-RUBBER WASTE.

14,027. Specification of Reissued Letters Patent. Reissued Dec. 7, 1915.

Original No. 978,583, dated December 13, 1910, Serial No. 545,959. Application for reissue filed October 2, 1914. Serial No. 864,700.

*To all whom it may concern:*

Be it known that I, CHARLES S. HELLER, a citizen of the United States, residing at Barberton, in the county of Summit and State of Ohio, have invented new and useful Improvements in an Apparatus for Use in Reclaiming Vulcanized-Rubber Waste, of which the following is a specification.

This invention relates to devices for use in re-claiming rubber waste, and the object thereof is to provide an improved device for use in connection with a process by which sulfur and other materials incorporated with the gum previous to the vulcanization thereof may be substantially removed therefrom in order to restore the rubber waste to as nearly as possible its original condition.

The invention contemplates providing a device in which the rubber waste, preferably in a comminuted condition, may be subjected to the action of suitable re-claiming agents in the form of a solution in the presence of heat and pressure, during which time constant agitation of the re-claiming solution containing the comminuted waste may be thoroughly and successfully carried out and at the same time the rubber waste may be subjected to the action of a current of electricity to remove therefrom not only the sulfur, but any other mineral substance contained therein.

The invention also contemplates the agitation of the comminuted rubber waste in the presence of heat and under pressure while contained in a suitable solution, so that substantially all particles of disintegrated fibrous material resulting from the use of a fabric in connection with the rubber will be eliminated.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the claims hereunto appended.

The drawing presented is a vertical, central sectional view of a preferred form of apparatus used in re-claiming rubber waste and embodying this invention.

Referring to the drawing, the reference numeral 1 denotes a sheet metal cylinder, preferably provided with one or more brackets 2 to rest upon I beams 3 by which the cylinder is supported. The upper end of the cylinder 1 is closed by means of a head 4 secured to the upper end of the cylinder 1 by rivets 5 and it is further provided with a steam inlet pipe 6. The lower end of the cylinder 1 is provided with a conically-formed bottom 7 to which is secured a member 8 with a central aperture therein and also further provided with an enlarged recess to receive a second member 9 exteriorly-threaded to coöperate with the member 8 and form a stuffing box for the upper end of a pipe 10 mounted therein, the upper end of which extends upwardly beyond the member 8. Within the cylinder 1 and spaced therefrom to form between them a steam chamber is a tank 11 the upper end of which is closed by a head 12 and having at its lower end a conically-formed bottom 13 with a depending pipe at the apex thereof communuicating with the upper end of the pipe 10.

The heads 4 and 12 of the cylinder 1 and tank 11 are provided with registering openings surrounded by an apertured collar 14 interposed between said heads, the aperture in which constitutes an opening 15 through which access is had to the interior of the tank 11. The opening 15 is closed through the medium of a swinging door 16 normally held in a closed position by means of a threaded hook bolt 17 engaging said door and rotatably-mounted in a brace 18 extending across said opening and drawn up to close said door by means of a hand nut 19. The side walls of the cylinder 1 and tank 11 are provided with lateral registering openings and between the walls of the cylinder 1 and tank 11 and having an opening in registering relation with the opening referred to is a collar 20. Secured to the outer face of the cylinder 1 by means of bolts 21 is the flanged end of a pipe 22, having an elbow 23, from which it depends and is connected with a horizontal pipe 24 by an elbow. Extending through a lug 25 formed on the latter elbow at the lower end of the pipe 22 is a shaft 26 mounted in bearings 27 and provided on its inner end with a propeller 28. The lug 25 is provided with a stuffing box 29 to prevent leakage of liquid from the pipe 22 outwardly along the shaft 26. The shaft 26 is also provided with a pulley 30 to receive a belt by which the propeller 28 is revolved.

On the inner face of the tank 11 and oppositely-disposed with respect to the flanged end of the pipe 22 is a pipe 31 having a portion thereof extending inwardly horizontally, from which depends a portion 32 arranged centrally with respect to the tank 11, the interior of the pipe 31 being in open communication with the interior of the pipe 22. Positioned centrally within the tank 11 is an inverted, conically-formed member 34 having an opening 35 at the apex thereof in alinement with the pipe 10. The inverted conically-formed portion 34 is provided with an upwardly-extending cylindrical portion 36. Supported by the cylindrical portion 36 is an annulus 37 preferably formed of zinc and insulated from the member 36 by an insulating member 38 and preferably somewhat smaller in diameter than the member 36. Connected with the zinc annulus 37 is a wire 39 passing through the wall of the tank 11 and cylinder 1 and protected therefrom by an insulating member 40 and connecting with one pole of an electric current-generating device 41, from the opposite pole of which extends another wire 42 to the ground 43. The ground 43 is preferably employed to complete the circuit between the wires 42 and 44, but of course any other means for uniting the outer ends of said wires may be employed which is deemed best.

Arranged centrally within the pipe 32 is a vertically shiftable valve-stem 45 having at its lower end a valve 46 arranged when in its operative position to close the opening 35 in the conical member 34 and when raised to an inoperative position to permit a passage of fluid through said opening. The upper end of the valve-stem 45 passes upwardly through the heads 4 and 12 of the cylinder 1 and tank 11, respectively, and is connected with one end of an operating lever 47 pivotally-mounted on a post 48 mounted on the upper face of the head 4 of the cylinder 1. The opposite end of the lever 47 is provided with a hand grasp by which the valve-stem 45 and valve 46 are shifted.

Communicating with the pipe 24 is a discharge pipe 49 provided with a valve 50. Connected with the lower end of the pipe 49 and in open communication therewith is a cleansing tank having a cylindrical medial portion 51, a conically-formed cover 52 and an inverted conically-formed bottom 53, the latter terminating in a discharge pipe 54 secured to the latter at the apex thereof. The cover 52 is provided with a stuffing box 55 at its apex to receive a vertically-shiftable upwardly-extending pipe 56 having secured to the lower end thereof a drum-shaped member 57 formed of wire cloth from which depends a drain-tube 58 extending into and telescoping the pipe 54. Mounted on the upper end of the pipe 56 is a cap 59 provided with an aperture through which extends a tube 60 held in position by nuts 61 placed above and below the cap 59. The pipe 60 extends downwardly into the member 57 and terminates in a bent nozzle 62 provided with a plurality of minute openings. This nozzle conforms generally in shape with the side walls of the member 57 and is arranged to be revolved with the pipe 60 as an axle within the member 57. Surrounding the cylindrical portion 51 of the cleansing tank is a steam pipe 63 from which extend inwardly through the wall 51 of the tank a plurality of steam pipes 64. These pipes 64 are preferably arranged radially to the cleansing tank and lie on the bottom 53 thereof and each is provided with a plurality of openings 65. The bottom 53 is provided near its apex with a discharge opening 66 closed by a grate 67.

The operation of the device is as follows: Through the opening 15 is supplied a quantity of comminuted rubber waste and a suitable quantity of re-claiming solution to the interior of the tank 11, the solution and rubber waste being sufficient to substantially cover the pipe 31, previous to which the valve 46 is moved downwardly to close the opening 35. The solution in the tank is kept constantly heated by live steam admitted to the space between the cylinder 1 and the tank 11 through the steam pipe 6. The heating of the contents of the tank during the carrying out of the re-claiming process is constantly maintained in order to insure perfect results from this device. After the solution and comminuted rubber waste have been placed within the tank, motion is communicated by a belt or other means to the shaft 26 to produce sufficient revolution of the propeller 28 to cause the solution and comminuted rubber to pass through the pipe 10 in the direction of the arrows, and as the solution passes from the pipe 10 it passes through the space between the conical portion 13 of the tank 11 and the conical member 34 and from thence upwardly around the zinc annulus 37 into which it flows. The action of the propeller in forcing the solution upwardly through the pipe 10 draws the solution and comminuted rubber contained in the conical member 34 up through the pipe 32 and pipe 31 into the pipe 22, from whence it passes to the pipe 24 and up through the pipe 10, during which operation it is brought into immediate contact with the wall of the tank 11 and its conical portion 13, so as to receive all possible heat from the steam contained in the space between the tank 11 and cylinder 1 and is thus constantly heated during its progressive movement. During its movement the rubber waste is subjected to the action of an electric current generated by the current-generating device 41 and carried by the wire 39 to the zinc annulus 37 which constitutes in this case a cathode from whence it passes through the solution surrounding the annulus 37 which is preferably electropositive to the tank 11, from which it is conducted to the cylinder 1 and returns through the wire 44, ground 43 and wire 42 to the current-generating instrumentality 41, thus completing the circuit. During its passage through the solution and rubber waste it tends to remove the sulfur and mineral matter carried by the comminuted rubber and thus assists the action of the solution in removing the deleterious matters contained in the rubber waste and restoring the same, as far as possible, to its condition previous to vulcanization. When this process of reclaiming rubber has been carried on a sufficient length of time the current from the instrumentality 41 is cut out and the motion of the propeller 28 arrested. The valve 46 is then raised permitting the matter contained in the conical member 34 to pass into the pipe 10 and from thence to the pipe 24. The gate 50 is then opened allowing the solution and rubber waste carried thereby to pass into the cleansing tank by means of the pipe 49.

The cleansing tank will preferably be partially filled with pure hot water to remove as far as possible the chemicals used for reclaiming the rubber and separating the deleterious matters therefrom. In order to increase the effectiveness of the water in the cleansing tank live steam is turned into the anuular pipe 63 from whence it passes to the pipe 64 and escapes by the orifices 65, the function of the steam jets from the pipes being to keep the solution contained in the cleansing tank in constant ebullition. After the cleansing process has been carried on for a sufficient length of time, the pipe 56, member 57 and pipe 58 are lowered sufficiently to cause the member 57 to be submerged in the solution which passes into the member 57 through the wire screen of which it is composed and escapes by means of the pipe 58, leaving the comminuted rubber within the cleansing tank. After the major portion of the liquid has been removed by the member 57 the latter is again raised and fresh water turned into the pipe 60 from whence it escapes through the orifices in the nozzle 62. At the same time the nozzle is rotated to cause the jets of water projected thereby to pass through the wire screen body of the member 57 and clean the latter. After a sufficient quantity of water has been placed in the tank steam is again turned into the same through the pipes 64 and the cleansing process renewed, and this is repeated until all of the solution employed for reclaiming rubber has been removed from the comminuted waste, after which and preferably while there is a considerable body of water in the cleansing tank, the gate 67 is opened and the water and comminuted rubber particles are permitted to escape by the discharge pipe 66 onto suitable screens, after which the rubber waste is dried and is ready for use.

What I claim is:

1. An apparatus for reclaiming rubber waste, comprising a closed vessel adapted to hold a reclaiming solution and comminuted rubber waste in a state of agitation, a relatively large circulating tube having an inlet and an outlet in direct and wide open communication with the submerged area in which the agitation of the solution and rubber waste takes place, the circulating path through the said vessel and tube being open and unobstructed for an uninterrupted flow of the combined solution and rubber waste, and a propeller adapted to produce a forced circulation of the solution and rubber waste through the vessel and tube.

2. An apparatus for reclaiming rubber waste comprising a vessel and means externally thereof to heat the same, a tubular conductor of relatively large capacity having an unrestricted intake open to the submerged space within the vessel and an exhaust into the bottom, a propeller adapted to circulate the solution and rubber waste downward through the tubular conductor and upward through the vessel, and electrical means in the vessel exposed to the solution and rubber waste adapted to cooperate with said propeller in the treatment of the rubber waste.

3. An apparatus for reclaiming rubber waste comprising a closed vessel adapted to hold a reclaiming solution and rubber waste under confinement, and means to heat the same through the wall thereof, a tube having unobstructed communication throughout its length and at its opposite ends with the submerged space within said vessel, and means to establish a constant forced circulation of the reclaiming solution and the rubber waste in a commingled state through the tube and the interior of the vessel.

4. An apparatus for reclaiming rubber waste comprising a closed receptacle for a reclaiming solution and rubber waste and means about the receptacle to heat the same, a relatively large tubular conductor for the solution and rubber waste having unobstructed openings at its ends communicating with the receptacle, and means to cause a forced flow of the combined solution and rubber waste through the conductor to agitate the solution in said receptacle, in combination with an electric circuit having one terminal in the receptacle relatively beneath the normal level of the solution therein, and another terminal formed by the walls of the receptacle, whereby the electric current is caused to traverse the solution and aid in the cleansing thereof.

5. An apparatus for reclaiming rubber waste comprising a metallic receptacle adapted to receive a reclaiming solution and rubber waste, means to heat the receptacle and its contents jointly, in combination with an electrical circuit having one terminal electrode within the said receptacle on a plane adapted to be covered by the solution and the other terminal electrode comprising the metallic receptacle.

6. An apparatus for reclaiming rubber waste comprising a receptacle adapted to receive a reclaiming solution and a steam jacket to heat the same, a tubular conductor open at one end to one portion of said receptacle and at the other end to the bottom thereof and a propeller in said tube to cause a circulation of the solution through said conductor, in combination with electrical connections having one terminal on a plane beneath the outlet to the said tubular conductor from said receptacle and the other attached to the receptacle.

7. An apparatus for reclaiming rubber waste comprising a double-walled receptacle adapted to hold a reclaiming solution, the space between the walls thereof constituting a heating chamber, and means to introduce heat to the same, the lower end of said receptacle conically-formed, a pipe at the conical end of said receptacle communicating with the interior thereof, a member corresponding substantially in contour with the interior of said receptacle positioned within and supported in spaced relation therewith, tubular conducting means having one end in open communication with the interior of said member and the opposite end communicating with said pipe, and means positioned in said tubular conducting means adapted to cause said solution to pass from the interior of said member through the said tubular means and the space between said member and the inner wall of said receptacle and to discharge into said member.

8. An apparatus for reclaiming rubber waste comprising a double-walled receptacle adapted to hold a reclaiming solution, the space between the walls thereof constituting a heating chamber and means to heat the same, a pipe at the lower end of said receptacle communicating with the interior thereof, a member corresponding substantially in contour with the interior of said receptacle positioned within and supported in spaced relation therewith, tubular conducting means having one end disposed within the interior of said member and the opposite end communicating with said pipe, and means for causing a flow of said solution through said tubular conducting means from the interior of said member to the space between said member and the inner wall of said receptacle and from thence to discharge into said member.

9. An apparatus for reclaiming rubber waste comprising a double-walled receptacle adapted to hold a reclaiming solution, the space between the walls thereof constituting a heating chamber, and means to introduce heat thereto, the lower end of said receptacle conically-formed, a pipe at said lower end communicating with the interior thereof, a member corresponding substantially in contour with the lower end of said receptacle provided with an opening, a valve to close said opening, a valve-stem for said valve extending outside of said receptacle, means for manipulating said valve-stem, tubular conducting means having one end disposed within said member and the opposite end communicating with said pipe, and means for causing said solution to pass from the interior of said member through said tubular conducting means to said pipe and from thence to the space between said member and the inner wall of said receptacle and to discharge into said member.

10. An apparatus for reclaiming rubber waste comprising a double-walled receptacle adapted to hold a reclaiming solution and provided with a filling opening normally adapted to be closed by a gate, the space between the walls thereof constituting a heating chamber and means to heat the same, the lower end of said receptacle conically-formed, a pipe at said lower end communicating with the interior thereof, a member corresponding substantially in contour with the lower end of said receptacle provided with an opening, a valve to close said opening, a valve-stem for said valve extending outside of said receptacle, means for manipulating said valve-stem, tubular conducting means having one end disposed within said member and the opposite end thereof communicating with said pipe, and means for causing said solution to pass from the interior of said member through said tubular conducting means to said pipe and from thence to the space between said member and the inner wall of said receptacle and to discharge into said member.

11. An apparatus for reclaiming rubber waste comprising a receptacle having an unobstructed opening in its bottom, a solution circulating tube in unobstructed communication with said opening in said bottom, and in unobstructed open communication at its opposite end with the interior of said receptacle below the normal level of the solution and rubber waste therein, and means for circulating the entire contents of said receptacle through said tube, in combination with a discharge pipe connected with said tube, and cleansing means for the rubber waste open to said discharge pipe.

CHARLES S. HELLER.

Witnesses:
E. G. ANDREE,
L. R. BARNES.